Dec. 22, 1970   D. T. O'CONNOR ET AL   3,548,644

HOT PRODUCT INSPECTION SYSTEM

Filed Jan. 16, 1967   3 Sheets-Sheet 1

INVENTORS
DONALD T. O'CONNOR
ARTHUR D. DEBB
KENNETH R. ERIKSON

BY *Hill, Sherman, Meroni, Gross & Simpson*   ATTORNEYS

Dec. 22, 1970     D. T. O'CONNOR ET AL     3,548,644
HOT PRODUCT INSPECTION SYSTEM
Filed Jan. 16, 1967     3 Sheets-Sheet 2

INVENTORS
DONALD T. O'CONNOR
ARTHUR D. DEBB
KENNETH R. ERIKSON

ATTORNEYS

Dec. 22, 1970  D. T. O'CONNOR ET AL  3,548,644

HOT PRODUCT INSPECTION SYSTEM

Filed Jan. 16, 1967  3 Sheets-Sheet 3

INVENTORS
DONALD T. O'CONNOR
ARTHUR D. DEBB
KENNETH R. ERIKSON

BY Hill, Sherman, Meroni, Gross & Simpson

ATTORNEYS

United States Patent Office 3,548,644
Patented Dec. 22, 1970

3,548,644
HOT PRODUCT INSPECTION SYSTEM
Donald T. O'Connor, Barrington, Arthur D. Debb, Blue Island, and Kenneth R. Erikson, Chicago, Ill., assignors to Magnaflux Corporation, Chicago, Ill., a corporation of Delaware
Filed Jan. 16, 1967, Ser. No. 609,641
Int. Cl. G01n 29/00
U.S. Cl. 73—71.5     1 Claim

ABSTRACT OF THE DISCLOSURE

Ultrasonic inspection system including a rigid roll in rolling pressure contact with a workpiece, serving to transmit ultrasonic energy between transducer means in the workpiece. The roll may also operate as one of a pair of reduction rollers and with a hot workpiece, the roll serves to protect the transducer means against excessive temperature. Either one or a plurality of transducers may be used. In one embodiment, the roll is hollow with the transducer means supported therewithin and a liquid may flow continuously through the hollow roll for ultrasonic coupling and to carry away heat. In another embodiment, the roll is solid and the ultrasonic waves are transmitted therethrough.

---

This invention relates to a system for acoustically determining the characteristics of a test body or workpiece and more particularly to a system wherein acoustic energy is efficiently transmitted between an acoustic transducer and a workpiece in a manner to permit accurate determination of characteristics of the workpiece. The system of this invention is particularly advantageous in that it can be used in the testing of workpieces at elevated temperatures.

In industries such as the steel industry which must deal with hot products, it has been considered impossible as a practical matter to determine the characteristics of the hot products while they remain hot and as a consequence, serious waste and inefficiency has resulted in such industries, many of which are essential to the welfare of the country. Acoustic testing systems have been used widely in industry for determining the characteristics of work products but have not been usable with hot products because the acoustic transducers cannot withstand elevated temperatures and no satisfactory means for transmission of energy between a transducer and a hot product has existed.

The present invention was evolved with the general object of overcoming the limitations and disadvantages of prior art systems and of providing a system for efficiently transmitting acoustic energy between a transducer and a workpiece, particularly a workpiece operated at an elevated temperature.

In accordance with this invention, a rigid roll is arranged for rolling pressure engagement and intimate contact of a surface portion of substantial area at an outer cylindrical surface thereof with a surface portion of a workpiece and acoustic transducer means are arranged adjacent another surface portion of the rigid roll. With this arrangement, efficient transmission of acoustic energy is obtained through the rigid roll and through the interengaged surface portions of the roll and the workpiece.

Preferably and in accordance with a specific feature of the invention, the rigid roll is capable of withstanding pressurized contact with a high temperature workpiece without deterioration, the rigid roll being preferably of steel.

In accordance with another specific feature of the invention, the rigid roll has dimensions such as to provide a heat flow path of substantial length between the workpiece and the transducer means so as to protect the transducer means against excessive temperature.

In one preferred embodiment of the invention, the rigid roll is hollow to provide a generally cylindrical inside surface in coaxial relation to the outer surface thereof, preferably with the transducer means being adjacent a portion of the inside surface of the hollow rigid roll in radial alignment with the outer surface portion thereof which is engaged with the workpiece.

In accordance with a further specific feature, the transducer means are mounted in a substantially fixed position inside the hollow rigid roll and means are provided for supplying a liquid into the hollow rigid roll to provide a couplant for transmission of the acoustic energy.

In another preferred embodiment of the invention, the transducer means is disposed adjacent a portion of the outer surface of the rigid roll in angularly spaced relation to the portion which is engaged with the workpiece, with the roll providing a path of solid homogeneous material for transmission of the acoustic energy. In this arrangement, the surface portions which are respectively adjacent the transducer means and engaged with the workpiece are preferably on diametrically opposite sides of the outer cylindrical surface of the rigid roll.

Another important feature of the invention is that continuously moving products such as blooms, slabs, sheets or the like may be readily tested. Preferably, a plurality of transducer units are disposed in axially spaced relation relative to the rigid roll, to permit testing of an entire cross-section of a workpiece, especially when the width of the workpiece is large as compared to the thickness thereof.

A further specific feature is in the provision of focusing means such that the energy may be transmitted in a narrow beam. Preferably, the focusing means includes a lens of the transducer means and a curved surface of the rigid roll.

In one preferred embodiment of the invention, the system includes pulse-echo apparatus for pulsing the transducer means to cause transmission of bursts of ultrasonic energy through the roll and into the workpiece with indicating means responsive to echo signals developed in response to reflected ultrasonic bursts. In another preferred arrangement, a through-transmission testing arrangement is provided with a pair of rigid rolls being engaged with opposite surfaces of a workpiece for transmission of acoustic energy into and out of the workpiece.

A still further specific feature of the invention is in the use of the system in the determination of the thickness of a part, which cannot be accurately determined by prior art systems, particularly in the case of hot work products.

Still other features of the invention relate to the physical design and relationship of the rigid rolls to the workpiece and the transducer means, and to electrical and electronic circuit arrangements for optimum testing and the most efficient and advantageous use of the coupling arrangement of this invention.

This invention contemplates other objects, features and advantages which will become more fully apparent from the following detailed description taken in conjunction with the accompanying drawings which illustrate preferred embodiments and in which.

Figure 1:
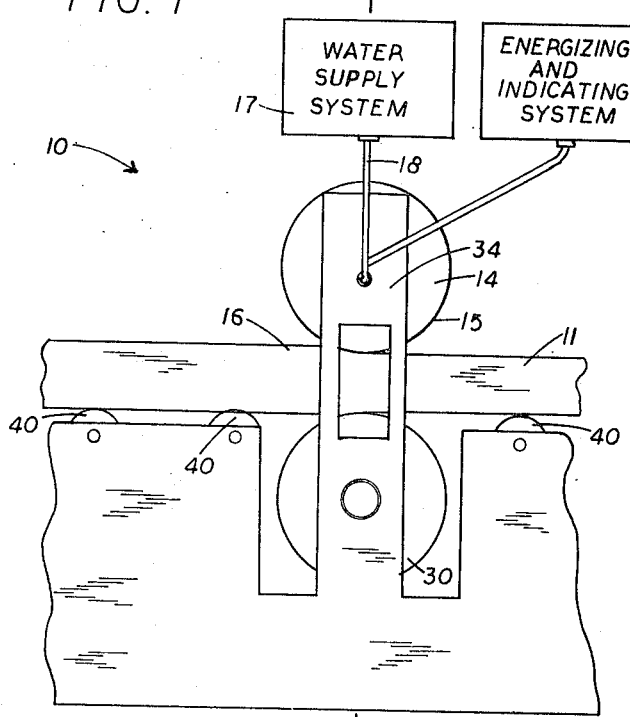
FIG. 1 is a diagrammatic side elevational view of a testing system constructed in accordance with the principles of this invention.
Figure 3:
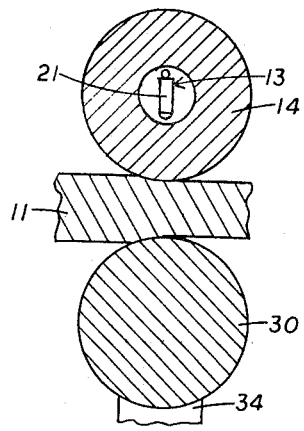
FIG. 3 is a sectional view taken substantially along line III—III of FIG. 2.
Figure 2:
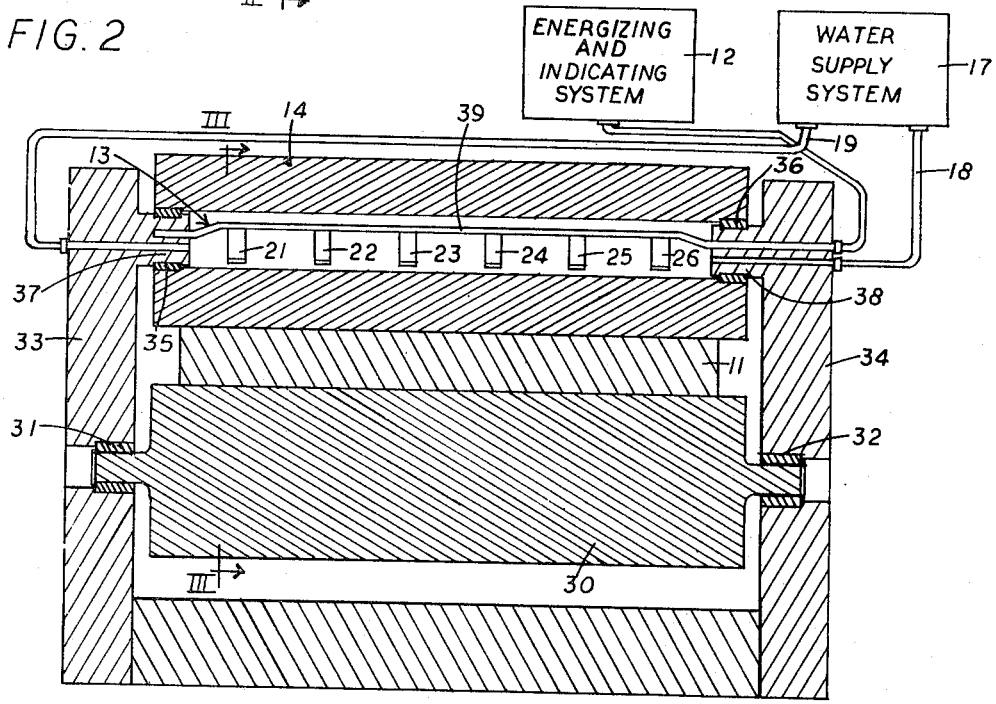
FIG. 2 is a sectional view taken substantially along line II—II of FIG. 1.

Referring to FIGS. 1-3, reference numeral 10 generally designates a system constructed according to the principles of this invention, designed for the testing of a hot bloom of steel 11, to determine the size and location of pipe and slag therein and to determine the proper point for cropping off the end of the bloom 11.

The system 10 comprises an energizing and indicating system 12 which is connected to a transducer assembly 13 disposed within a hollow rigid roll 14 having an outer cylindrical surface 15 in rolling pressure engagement with an upper surface 16 of the hot bloom 11.

To obtain acoustic coupling between transducers of the assembly 13 and the roll 14, a suitable water supply system 17 is provided, arranged to supply water through a conduit 18 into one end of the roll 14 and to receive water through a conduit 19 from the other end of the roll 14.

In the illustrated system, the assembly 13 comprises six axially spaced transducers 21-26 each of which has a lower end face arranged to transmit and receive ultrasonic energy to and from a lower upwardly facing portion of the inside surface of the hollow rigid roll 14. The ultrasonic energy is transmitted through the water into the roll 14 and from the roll 14 into the bloom 11, to be reflected by inhomogeneities within the bloom 11, as well as by the upper and lower surfaces of the bloom 11.

The pressure between the roll 14 and the bloom 11 is such that a surface portion of the roll 14 of substantial area is always in intimate contact with a surface portion of the bloom 11, so as to obtain efficient transmission of the acoustic energy. To obtain such pressure engagement, a second roll 30 is preferably disposed below the roll 14, with the bloom 11 being passed therebetween, and support means are provided for journalling the rolls for rotation about axes in fixed spaced parallel relation. As diagrammatically illustrated, reduced diameter end portions of the roll 30 are journalled by means of bearings 31 and 32 in fixed upright supports 33 and 34 and the roll 14 is journalled by means of bearings 35 and 36 on shaft elements 37 and 38 projecting inwardly from the upright supports 33 and 34. A rod 39 extends between the shaft elements 37 and 38, to support the transducers 21-26 within the hollow roll. The bearings 35 and 36 may preferably include suitable seals to prevent loss of water from the interior of the roll 14 and to insure good acoustical coupling. Suitable rollers 40 support the bloom 11 for travel before and after passing between the rolls 14 and 30.

With rolls 14 and 30 in pressure engagement with a hot bloom, they operate as reduction rollers to produce a reduction in the thickness of the bloom 11. The reduction is exaggerated in the drawings from what would normally occur. It will be understood, however, that the roll used for testing may also serve as a reduction roll in a metal forming operation, to thus serve a dual function. If desired, suitable back-up rolls may be provided for the rolls 14 and 30.

An important feature is that the rigid roll 14 has dimensions such as to provide a heat flow path of substantial length between the bloom 11 and the transducers 21-26, to protect the transducers against excessive temperature. By way of example and not by way of limitation, the hollow roll 14 may have an outer diameter of six inches and an inner diameter of two inches and it may preferably be of steel. To further protect the transducers 21-26 against excessive temperature, the water may flow continuously through the roll 14. It is to be noted that the invention is not necessarily limited to the use of water as a couplant and coolant, and oil or other liquids may be used.

Figure 7:
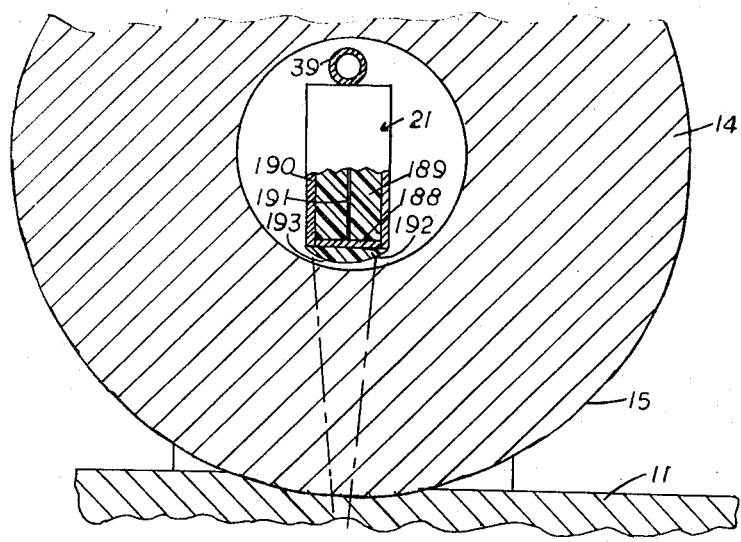
FIG. 7 is an enlarged cross-sectional view corresponding to a portion of FIG. 3 and illustrating a preferred construction of a transducer by which a focusing action is obtained.

Six transducers are provided in the illustrated system to facilitate testing of the entire cross section of the bloom 11, the width of which is substantially greater than the thickness thereof. Each of the transducers 21-26 may preferably have a construction as illustrated in FIG. 7 and as described hereinafter, to obtain a focusing action.

Figure 4:
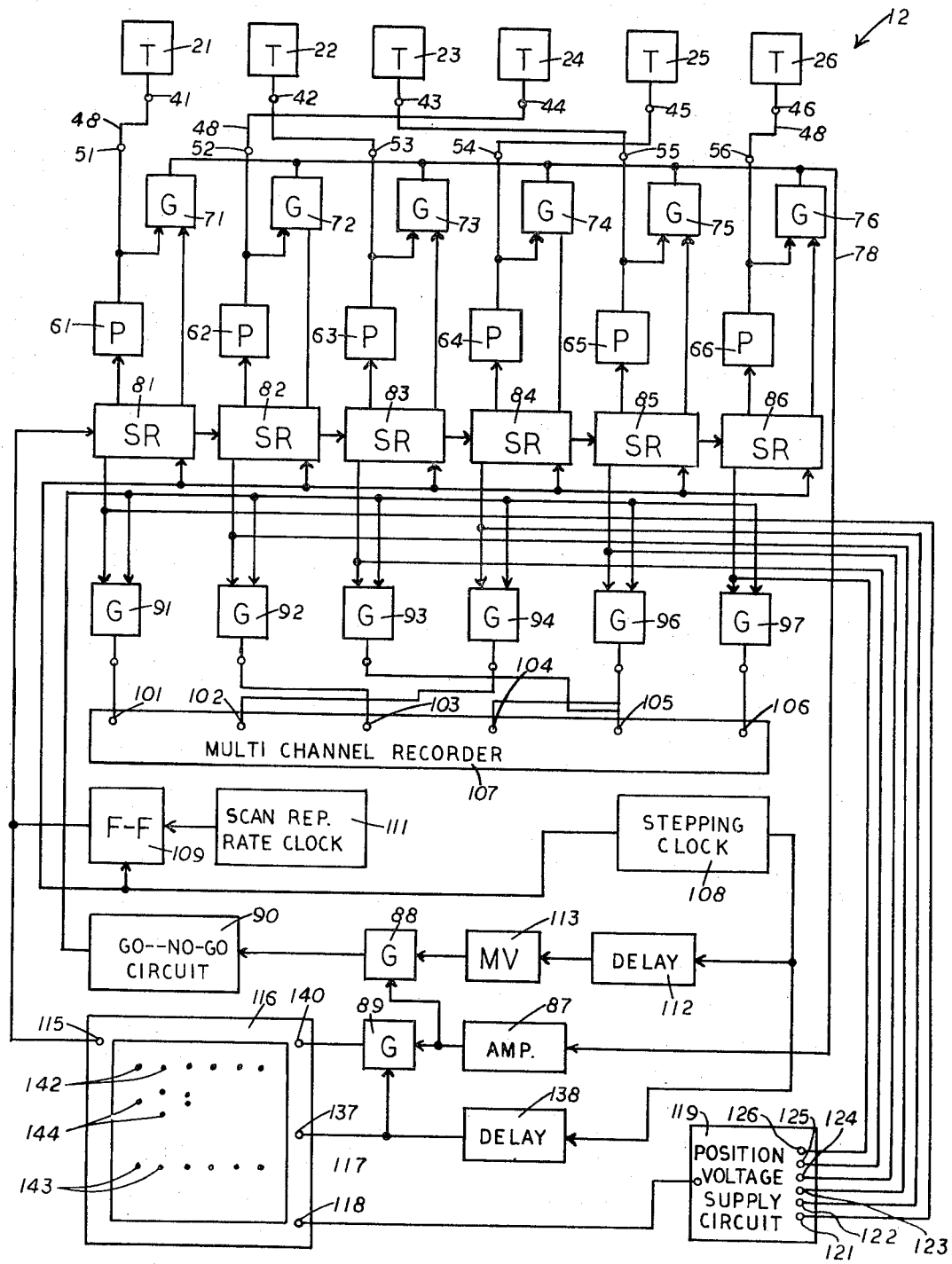
FIG. 4 is a schematic diagram of an energizing and indicating system and the connection thereof to transducers of the system.

FIG. 4 shows an electrical system for energizing the transducers 21-26 and for producing indications from the signals developed by the transducers 21-26. Referring thereto, the transducers 21-26 are respectively connected to terminals 41-46 which are connectable through conductors 48 to terminals 51-56 to which pulsing signals are applied from pulsers 61-66 with terminals 51-56 being also connected through gates 71-76 to a line 78, connected to indicating means. In the illustrated system, a staggered pulsing order is used with no two adjacent transducers being pulsed consecutively. This substantially eliminates a residual sound problem which would otherwise be encountered due to the time required for sound reverberating in the bloom 11 to be attenuated below a detectable level. As a result, a higher speed of operation is possible, with greatly improved results.

Connections are illustrated in FIG. 4 for a pulsing order of 1, 4, 2, 5, 3, 6, considering the transducer 21 as the No. 1 transducer and the transducer 26 as the No. 6 transducer. Thus, terminals 41-46 are respectively connected to terminals 51, 54, 52, 55, 53 and 56. It will be understood that other pulsing orders are possible. It is to be further noted that any number of transducers can be used, including a single transducer, depending upon the configuration of the workpiece and the type of testing operation which is employed.

To control sequential operation of the pulsers 61-66, they are respectively connected to outputs of a series of shift register stages 81-86 which are connected in cascade. The shift register stages 81-86 also control operation of the gates 71-76. For example, after application of a signal from the shift register stage 81 to the pulser 61, the shift register stage 81 applies a signal to the gate 71 to open or enable the gate 71 and to allow application of echo signals from the transducer 21 through the gate 71 to the line 78.

The outputs of the gate circuits 71-76 are applied through the line 78 to the input of an amplifier 87 having an output connected to the inputs of a pair of gates 88 and 89 which are opened in synchronism with the pulsing of the transducers 21-26 but only for time intervals corresponding to the reception of signals from selected regions, such as the interior portion of the bloom 11 in which it is desired to detect the presence or absence of pipe, slag and other flaws.

The output of the gate 88 is applied through a threshold or "GO—NO-GO" circuit 90 to the inputs of six gates 91–96 having enabling inputs connected to the shift register stages 81–86 and having outputs connected to terminals 101–106 of a multi-channel recorder 107. The recorder 107 may preferably have wire electrodes or recording styli connected to the terminals 101–106 to record on a moving strip of paper any electrical signals received at the terminals 101–106. A staggered connection is used corresponding to the staggered connection of terminals 41–46 to terminals 51–56. Thus, the outputs of gates 91–96 are connected to terminals 101, 104, 102, 105. 103 and 106, respectively.

To operate the shift register stages 81–86 they are all connected to a stepping clock 108 which determines the scanning rate. By way of example, the stepping clock may be adustable to operate at any rate within the range of from 300 to 6,000 pulses per second. The first stage 81 is additionally connected to a bistable circuit or flip flop 109 which is connected to the stepping clock 108 and also to a scanning repetition rate clock 111. Clock 111 determines the rate at which the transverse electronic scanning operation is repeated and may, for example, be adjustable to operate at any rate of from 500 to 1,000 pulses per second.

In operation, the shift register stages 81–86 may all be in an inoperative condition with a "zero" stored therein, with no enabling signals being applied to the pulsers 61–66 or the gates 71–76 and 91–96. When a pulse is applied from the scanning repetition rate clock 111 to the flip flop 109, the flip flop is placed in a "set" condition. The next pulse from the stepping clock 108 resets the flip flop 109 which then applies a signal to the first shift register stage 81 to place the first stage 81 in an operative condition with a "one" being stored therein. The first pulser 61 is then operated to apply a pulse to the first transducer 21 and the gates 71 and 91 are opened or enabled. The next pulse from the stepping clock 108 operates on the first shift register stage 81 to place it in its initial "zero" condition and to cause it to apply a signal to the second shift register stage 82, placing it in its operative condition, with a "one" being stored therein. The second pulser 62 and the gates 72 and 92 are then operative. With subsequent pulses applied from the stepping clock 108, the "one" is shifted to succeeding stages until the "one" is shifted out of the final stage. The shift register is then dormant until another pulse is applied from the scanning repetition rate clock 111 to the flip flop 109.

Signals from the stepping clock 108 are also applied through a delay circuit 112 to a monostable multivibrator 113 which opens the gate 88 for an appropriate time interval, to cause response to pulses reflected from flaws in the interior portion of the bloom 11, where inspection is desired. With this operation of the transmission-detection system, a hot bloom inspection is provided whereby an indication is recorded on a moving strip of paper corresponding to interior inhomogeneities in the bloom such as caused by the presence of pipe, slag or other flaws. The lateral position of the recorded indications on the strip corresponds to the lateral position of the flaw in the bloom 11, and the longitudinal position of the recorded indications corresponds to the lengthwise position of the flaw in the bloom 11. The depth of the flaw in the bloom 11 is not indicated with this system, but enough information is obtained to indicate where the bloom 11 should be cropped off to eliminate the flaws therein.

Another portion of the energizing and indicating system 12 provides information concerning the depth and lateral position of flaws in the bloom 11 and may also serve to provide a measurement of the thickness of the bloom 11. In particular, the output of the flip flop 109 is connected to an erasure terminal 115 of an oscilloscope 116 having a screen 117. The erasure terminal 115 is connected to cause the screen 117 of the oscilloscope 116 to be erased of all indications when a pulse is received from the flip flop 109. In this manner, the screen is erased each time the flip flop 109 causes the shift registers 81–86 to begin a new cycle, for pulsing the six transducers 21–26 across the width of the bloom 11.

An input terminal 118 controls the horizontal position of indications on the screen 117 and is connected to the output of a position voltage supply circuit 119 having input terminals 121–126 connected to outputs of the shift register stages 81–86. The position voltage supply circuit 119 develops a voltage at its output to control the horizontal position of indications on the screen 117 in accordance with energizing signals applied from the shift register stages 81–86. In particular, a signal to the terminal 121 causes the circuit 119 to supply a first voltage to the input terminal 118 of the oscilloscope 116 which places all indications at a first horizontal position at the left side of the screen 117. A signal at the input terminal 122 causes the circuit 119 to supply a second voltage, slightly different from the first voltage, which places all indications at a second horizontal position to the right of the first horizontal position. With successive application of signals to the terminals 123–126, the position of the indications are shifted progressively to the right. The terminals 121–126 are connected to outputs of the shift register stages 81–86 in an order corresponding to the order of connection of the terminals 51–56 to the terminals 41–46. Thus, terminals 121–126 are respectively connected to outputs of the shift register stages 81, 84, 82, 85, 83 and 86.

A vertical sweep input terminal 137 of the oscilloscope 116 is connected through a delay circuit 138 to the output of the stepping clock 108. With this arrangement, each pulse from the stepping clock 108, after a certain delay, causes a vertical sweep of the oscilloscope 116 at a velocity which may be selected to correspond to the velocity of travel of the sound waves through the bloom 11.

A brightness control input terminal 140 of the oscilloscope 116 is connected through the gate 89 to the output of the amplifier 87, to control brightness of the indications on the screen 117 in response to amplified signals from the transducers 21–26. The enabling input of gate 89 is connected to the output of the delay circuit 138. In operation, the gate 89 is opened after a certain delay by a pulse from the stepping clock 108 to apply all echo signals from the transducer which is then functioning to the input terminal 140 of the oscilloscope 116 to control brightness. The vertical sweep circuit of the oscilloscope 116 operates at the same time to position the echo indications at positions on the screen 117 corresponding to positions within the bloom 11. With the horizontal positions of the indications being controlled from the position control circuit 119 as explained above, an indication pattern is produced on screen 117 which provides information concerning the thickness of the bloom 11 and the positions of inhomogeneities therein.

As an example of the type of indication which may be produced on the screen 117, an indication pattern is shown on the screen 117 in FIG. 4, which comprises six dot indications forming a line 142, six dot indications forming a line 143 and five dot indications forming a generally oval pattern 144. The six dot indications forming the line 142 represent the reflections from the top surface of the bloom 11 while the six dot indications forming the line 143 represent the reflections from the bottom surface of the bloom 11. The five dot indications forming the generally oval pattern 144 represent reflections from top and bottom surfaces of a flaw or inclusion in the bloom 11.

A new indication pattern is formed on the screen 117 each time the shift registers 81–86 complete a cycle of operation and the screen 117 may be erased by a signal from the flip flop 109 at the beginning of each new cycle. With the bloom 11 moving through the rolls 14 and 30, each new indication pattern represents a cross sectional view of the bloom 11 at a different point along the length of the bloom 11. If desired, a camera may be provided to take photographs of the successive indication patterns and such photographs may be correlated with the indications from the multi-styli recorder 107 to indicate the position along the length of the bloom 11 which each photograph represents.

It will be apparent that the energizing and indicating system may be modified according to the type of workpiece which is tested and the type of information desired. For example, a single transducer may be used in testing workpieces which are comparatively narrow, or where it is desired to measure thickness or develop flaw indications from only a restricted portion of a workpiece. A number of transducers greater than the illustrated six transducers may be provided for the testing of comparatively wide thin plate or the like. It is further noted that there are many possible variations of the physical arrangement of the inspection system of this invention and two important modifications are shown in FIGS. 5 and 6.

Figure 5:
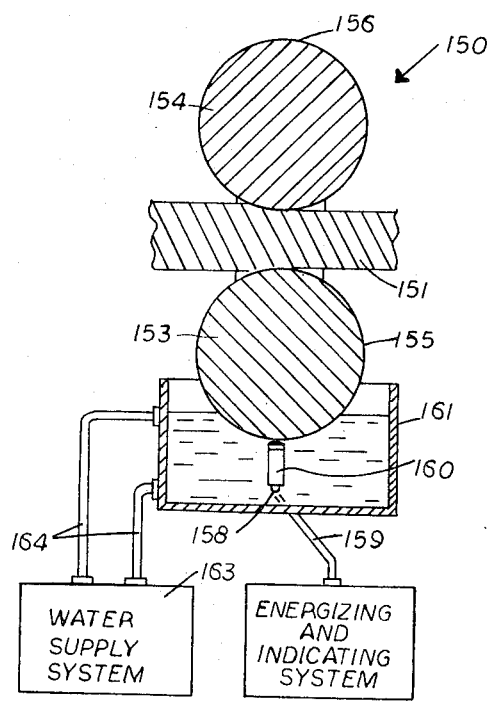
FIG. 5 is a sectional view similar to FIG. 3 but showing a modified testing system.

FIG. 5 is a cross sectional view of a modified ultrasonic inspection system 150 constructed according to the principles of this invention. In the system 150, a hot bloom 151 is rolled between two solid metal rolls 153 and 154 having outer cylindrical surfaces 155 and 156 engaged with lower and upper surfaces of the bloom 151, sufficient pressure being applied to provide interengaged surface portions in intimate contact for efficient transmission of acoustic energy. A hollow support tube 158 having coaxial cables 159 therein supports and supplies electrical signals to one or more transducers 160 disposed underneath the bottom roll 155. A tank 161 is provided for immersing the transducers 160 and the lower portion of the roll 153, to provide a water couplant between the transducers 160 and the roll 153. The water may also serve to keep the transducers 160 at a safe temperature. A suitable water supply system 163 may be coupled to the tank 161 through conduits 164. The transducers 160 are connected through the cables 159 to an energizing and indicating system 165 which may have a construction similar to that of the system 12 shown in FIG. 4 and described above.

In the arrangement as shown in FIG. 5, the transducers 160 are located adjacent surface portions of the roll 153 which are diametrically opposite the surface portions engaged with the bloom 151, and the roll 153 is a solid homogeneous roll to provide a direct path for travel of the acoustic or ultrasonic energy. In some circumstances, the transducer or transducers may be positioned at an angular spacing other than 180°, so as to transmit the energy into the bloom or other workpiece at an angle. In any case, of course, the roll 153 should be such as to provide a solid homogeneous path for travel of the energy.

Figure 6:
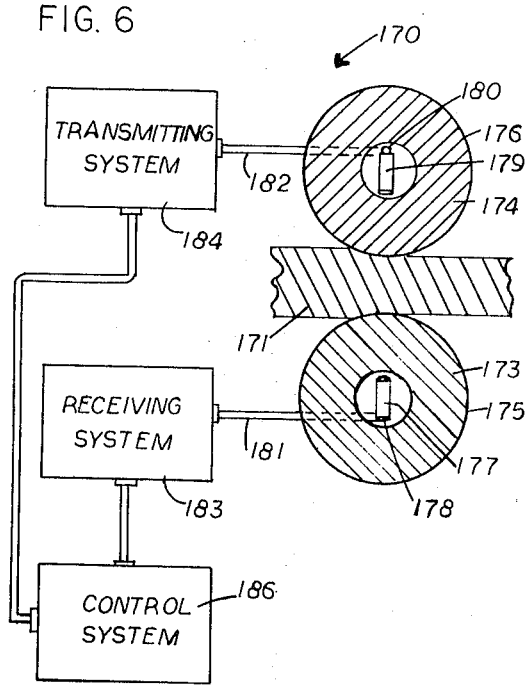
FIG. 6 is another sectional view similar to FIG. 3, but illustrating another modified testing system.

FIG. 6 is a cross sectional view showing a through-transmission system 170 constructed according to the principles of this invention. A hot bloom 171 is rolled between two hollow metal rolls 173 and 174 having outer cylindrical surfaces 175 and 176 engaged with lower and upper surfaces of the bloom 171.

One or more transducers 177 are supported on a rod 178 within the roll 173 and one or more transducers 179 are supported on a rod 180 within the roll 174. Suitable water supply systems, not shown, are provided for supplying water into the rolls 173 and 174, to provide acoustic coupling between the transducers 177 and 179 and the internal surfaces of the rolls 173 and 174. The transducers 177 and 179 are respectively connected through cables 181 and 182 to receiving and transmitting systems 183 and 184.

In operation, the transmitting system 184 supplies electrical energy to the transducers 179, which operate to transmit acoustic energy through the water to an interior surface portion of the roll 174, the energy being preferably at an ultrasonic frequency. The energy is transmitted through the roll 174 and through the portion of the outer surface 176 thereof which is engaged with the upper surface of the bloom 171, and into the bloom 171 to travel through the interengaged surface portions of the bloom 171 and the roll 173. The energy then travels through the roll 173 and through the water to the receiving transducers 177. Either continuous or pulsed waves may be used. With pulsed waves, an acoustic control system 186 may be provided to apply triggering pulses to the transmitting system 184 and to apply timing pulses to the receiving system 183 to gate the receiving system 183 during time intervals corresponding to the time required for the energy to travel from the transmitting transducers 179 to the receiving transducers 177.

FIG. 7 is an enlarged cross-sectional view corresponding to a portion of FIG. 3, and illustrates a preferred construction of the transducer 21, by which a focusing action is obtained. It will be understood that the construction of the transducers 22–26 and also the transducers 160, 177 and 179 may be substantially the same as that of the transducer 21 as illustrated.

The transducer 21 comprises a transducer element 188 of a suitable piezoelectric material preferably in the form of a flat plate or disc. The element 188 is cemented to the lower end of a backing member 189 disposed within a metal casing 190. A thin electrode on the lower face of the element 188 is electrically connected to the casing 190 while a thin electrode on the upper face of the element 188 is connected to a conductor 191. Conductor 191 is connected through a conductor within the support rod 39, for connection to the energizing and indicating system as described above in connection with FIG. 4.

In accordance with a specific feature of the invention, a focusing element 192 is provided having a flat upper face cemented to the lower face of the transducer element 188 and having a lower convex face 193. The lower convex face 193 cooperates with the inside cylindrical surface of the hollow roll 14 to concentrate the ultrasonic energy into a converging beam, as indicated by broken lines in FIG. 7. With this arrangement, the energy may pass through the portions of the interengaged surfaces of the roll 14 and the bloom 11 where the pressure is greatest and where the most effective coupling is obtained. In addition, the resolving power is increased to permit detection of smaller flaws. In the illustrated system the face 193 is preferably cylindrically convex, either about the axis of the roll 14 or about an axis in spaced parallel relation thereto, to permit a slight spreading of the beam in a plane through the axis of the roll 14, and to allow a greater axial spacing of the transducers. However, a spherically convex face may be used in many applications.

It will be understood that modifications and variations may be effected without departing from the spirit and scope of the novel concepts of this invention.

We claim as our invention:

1. In an ultrasonic system including ultrasonic transducer means for transmission and reception of ultrasonic energy into and from a workpiece having a temperature substantially higher than the maximum operative temperature of said transducer means, a support structure, a rigid hollow roll having a generally cylindrical outer surface engageable with said work piece, a pair of bearing means journalling opposite ends of said rigid hollow roll for rotation on said support structure and for rolling engagement of said generally cylindrical outer surface with said workpiece, support means within said rigid hollow roll and fixedly secured at at least one end thereof to said support structure within said bearing means, means securing said transducer means to said support means within said rigid hollow roll, and means for continuously flowing a liquid through one of said bearing means into said rigid hollow roll and out through the other of said bearing means, said liquid providing a couplet for transmission of ultrasonic waves and being operative to carry away heat to protect said transducer means against excessive temperature.

References Cited

UNITED STATES PATENTS

| | | | |
|---|---|---|---|
| 2,545,101 | 3/1951 | Meunier | 73—71.5X |
| 3,074,267 | 1/1963 | Martin | 73—67.5 |
| 3,117,276 | 1/1964 | Beyer et al. | 73—67.7X |
| 3,404,551 | 10/1968 | Spisak | 73—67.5X |
| 3,401,547 | 9/1968 | Hall et al. | 72—16 |

FOREIGN PATENTS

| | | | |
|---|---|---|---|
| 39,671 | 3/1957 | Poland | 73—67.8 |

CHARLES A. RUEHL, Primary Examiner

U.S. Cl. X.R.

72—16; 73—67.5